(12) United States Patent
Kim et al.

(10) Patent No.: US 8,730,899 B2
(45) Date of Patent: May 20, 2014

(54) FIXED RESOURCE ALLOCATION METHOD AND DEVICE IN A BROADBAND WIRELESS COMMUNICATION SYSTEM

(75) Inventors: Jeongki Kim, Gyeonggi-Do (KR); Kiseon Ryu, Gyeonggi-Do (KR); Youngsoo Yuk, Gyeonggi-Do (KR)

(73) Assignee: LG Electronics Inc., Seoul (KR)

(*) Notice: Subject to any disclaimer, the term of this patent is extended or adjusted under 35 U.S.C. 154(b) by 42 days.

(21) Appl. No.: 13/513,509

(22) PCT Filed: Dec. 3, 2010

(86) PCT No.: PCT/KR2010/008641
§ 371 (c)(1), (2), (4) Date: Jun. 1, 2012

(87) PCT Pub. No.: WO2011/068384
PCT Pub. Date: Jun. 9, 2011

(65) Prior Publication Data
US 2012/0281652 A1    Nov. 8, 2012

Related U.S. Application Data

(60) Provisional application No. 61/266,163, filed on Dec. 3, 2009.

(30) Foreign Application Priority Data

Sep. 1, 2010   (KR) .................. 10-2010-0085648

(51) Int. Cl.
*H04W 4/00* (2009.01)
(52) U.S. Cl.
USPC ............ 370/329; 370/338; 370/341; 370/348

(58) Field of Classification Search
USPC .................................. 370/280, 315, 329, 336
See application file for complete search history.

(56) References Cited

U.S. PATENT DOCUMENTS

| | | | |
|---|---|---|---|
| 2007/0115970 A1 | 5/2007 | Jang et al. | |
| 2009/0092103 A1* | 4/2009 | Rao ................................ | 370/336 |
| 2009/0219853 A1* | 9/2009 | Hart et al. ..................... | 370/315 |
| 2009/0219878 A1* | 9/2009 | Oh et al. ........................ | 370/329 |
| 2010/0061314 A1* | 3/2010 | Oh et al. ........................ | 370/329 |
| 2010/0182939 A1* | 7/2010 | Ojala et al. .................... | 370/280 |
| 2010/0215002 A1 | 8/2010 | Kim et al. | |
| 2010/0290411 A1 | 11/2010 | Kim et al. | |

FOREIGN PATENT DOCUMENTS

| | | |
|---|---|---|
| KR | 10-2009-0003086 A | 1/2009 |
| WO | WO 2008/113966 A1 | 9/2008 |

* cited by examiner

*Primary Examiner* — Brian D Nguyen
*Assistant Examiner* — Toan Nguyen
(74) *Attorney, Agent, or Firm* — Birch, Stewart, Kolasch & Birch, LLP

(57) ABSTRACT

The present invention is a method for operating terminals in a broadband wireless communication system in which a persistent allocation technique is employed, comprising the steps of: receiving a persistent resource allocation message from a base station; determining whether or not the persistent resource allocation message includes frame position information related to a second persistent resource allocation; deciding a frame position for allocating a persistent resource based on a persistent allocation period and the frame position information included in the persistent resource allocation message, when it is determined that the frame position information related to the second persistent resource allocation is included; and receiving a data packet using the persistently allocated resource at the decided frame position.

12 Claims, 10 Drawing Sheets

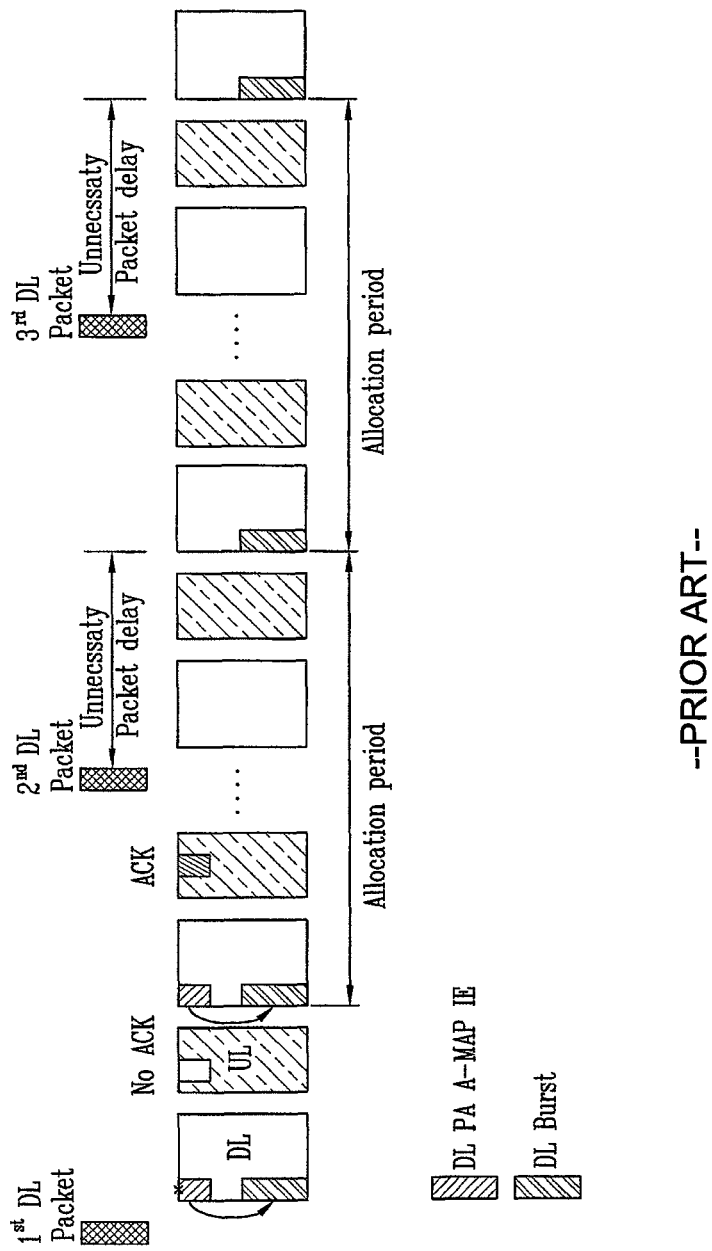

--PRIOR ART--

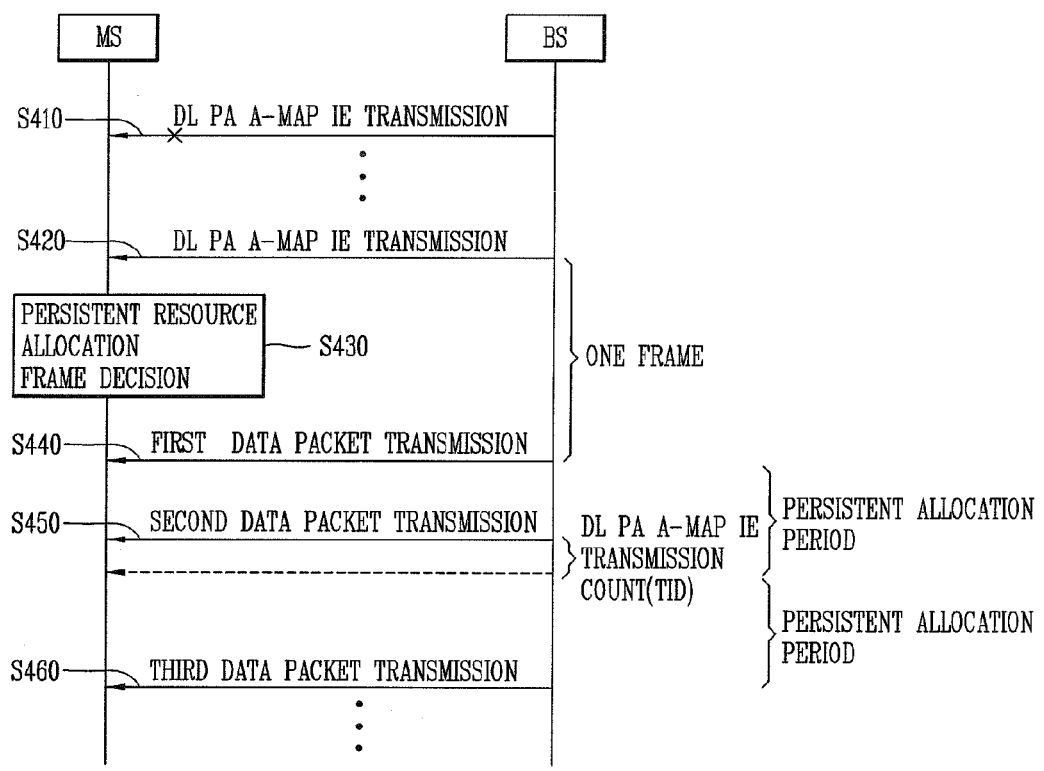

FIXED RESOURCE ALLOCATION METHOD AND DEVICE IN A BROADBAND WIRELESS COMMUNICATION SYSTEM

CROSS REFERENCE TO RELATED APPLICATIONS

This application is the National Phase of PCT/KR2010/008641 filed on Dec. 3, 2010, which claims priority under 35 U.S.C. §119(e) to U.S. Provisional Application No. 61/266,163 filed on Dec. 3, 2009 and under 35 U.S.C. §119(a) to Patent Application No. 10-2010-0085648 filed in the Republic of Korea on Sep. 1, 2010, all of which are hereby expressly incorporated by reference into the present application.

TECHNICAL FIELD

The present disclosure relates to a persistent resource allocation method and device in a broadband wireless access system, and more particularly, a method and device for receiving a persistently allocated resource, capable of reducing a delay of a data packet.

BACKGROUND ART

When a base station tries to allocate a downlink persistent resource, it transmits a DL persistent allocation A-MAP IE to a terminal to which the downlink resource should be allocated. Upon reception of the DL persistent allocation A-MAP IE, the terminal periodically receives the allocated downlink resource based on information included in the corresponding IE, and receives packets transmitted by the base station using the allocated resource. Also, when the base station tries to allocate an uplink persistent resource, it transmits an UL persistent allocation A-MAP IE to a terminal to which the uplink resource should be allocated. Upon reception of the UL persistent allocation A-MAP IE, the uplink resource is periodically allocated to the terminal based on information included in the corresponding IE and the terminal transmits a packet to the base station using the allocated resource.

FIG. 1 illustrates a general persistent resource allocation method through a persistent resource allocation message (for example, Persistent Allocation A-MAP IE). Especially, FIG. 1A illustrates a downlink (DL) persistent resource allocation, and FIG. 1B illustrates an uplink (UL) persistent resource allocation.

Hereinafter, a DL persistent resource allocation will be exemplarily described.

First, a terminal receives a DL Persistent Allocation A-MAP IE from a base station. The terminal receives an allocated persistent resource using the received DL Persistent Allocation A-MAP IE, and receives data packets from the base station using the allocated persistent resource. Also, the terminal receives data packets at the same position as a position, to which a persistent resource has been initially allocated, at each predetermined period, namely, at each predetermined frame interval based on persistent allocation period information included in the DL Persistent Allocation A-MAP IE.

As illustrated in FIG. 1A, under a bad channel condition between the base station and the terminal, the terminal does not immediately receive the DL Persistent Allocation A-MAP IE transmitted from the base station, but receive the A-MAP IE after performing a retransmission process. This causes a persistent pattern of an unnecessary packet transmission delay not only for a first packet indicated by the DL Persistent Allocation A-MAP IE but also for every new packet generated after the first packet.

However, the packets allocated through the DL Persistent Allocation A-MAP IE generally correspond to a real-time service, such as VoIP. Hence, the packets of the service are sensitive to the delay. Therefore, unless more than preset delay requirements are met, the delayed packets are deleted at an upper layer, so transmission thereof is failed.

Especially, when a persistently allocated resource is allocated to a terminal by two or more retransmissions of the DL Persistent Allocation A-MAP IE and a channel condition is bad at a specific time point, a corresponding packet is further delayed.

DISCLOSURE OF THE INVENTION

Therefore, to obviate those problems, an aspect of the detailed description is to provide a method and device for receiving an allocated persistent resource, in which a persistent resource allocation message includes frame position information related to a second persistent resource allocation.

To achieve these and other advantages and in accordance with the purpose of the present invention, as embodied and broadly described herein, there is provided a method for receiving a persistently allocated resource in a method for operating a terminal in a broadband wireless communication system in which a persistent allocation technique is employed, the method including receiving a persistent resource allocation message from a base station, determining whether or not the received persistent resource allocation message includes frame position information related to a second persistent resource allocation, deciding a frame position for allocating a persistent resource based on a persistent allocation period and the frame position information included in the persistent resource allocation message when it is determined that the frame position information related to the second persistent resource allocation is included, and receiving a data packet using the persistently allocated resource at the decided frame position.

The frame position information may be frame offset information indicating that the frame for the second persistent resource allocation is located after predetermined frame offsets from a frame to which a first persistent resource is allocated.

The frame position information may be frame offset information indicating that the frame for the second persistent resource allocation is located before predetermined frame offsets after the persistent allocation period from a frame to which a first persistent resource is allocated.

The frame position information may be information indicating the number of times that the persistent resource allocation message is transmitted.

The deciding of the frame position for allocating the persistent resource may include deciding a frame position for allocating a second persistent resource using the frame position information, and deciding a frame position for allocating a persistent resource after the second persistent resource according to the persistent allocation period information.

To achieve these and other advantages and in accordance with the purpose of the present invention, as embodied and broadly described herein, there is provided a method for receiving a persistently allocated resource in a method for operating a terminal in a broadband wireless communication system in which a persistent allocation technique is employed, the method including receiving a persistent resource allocation message from a base station, determining whether a frame position to which a persistent resource has been allocated through the received persistent resource allocation message is identical to a frame position where an uplink data packet is generated in the terminal, and transmitting a control message including frame latency information to the base station when it is determined that the persistent resource-allocated frame position is not identical to the uplink data packet-generated frame position.

The frame latency information may be information indicating that the persistent resource-allocated frame position has to be adjusted to precede a current frame position.

The control message may be either a Frame Latency Adjustment Extension Header (FLAEH) or a Piggyback Bandwidth Request Extension Header (PBREH).

To achieve these and other advantages and in accordance with the purpose of the present invention, as embodied and broadly described herein, there is provided a device in a terminal in a broadband wireless communication system in which a persistent allocation technique is employed, the device including a receiving unit configured to receive a persistent resource allocation message including persistent resource allocation information, a message interpreting unit configured to check the persistent resource allocation message and determine whether a frame position to which a persistent resource has been allocated is identical to a frame position where an uplink data packet is generated in the terminal, a message generating unit configured to generate a message including frame latency information when it is determined that the persistent resource-allocated frame position is not identical to the uplink data packet-generated frame position, and a transmitting unit configured to transmit the generated message.

The frame latency information may be information indicating that the persistent resource-allocated frame position has to be adjusted to precede a current frame position.

Advantageous Effect

In accordance with the detailed description, a persistent resource allocation message may be transmitted by including position information related to a frame to which a second persistent resource is allocated, thereby reducing an unnecessary transmission delay of data packets after a first data packet.

BRIEF DESCRIPTION OF THE DRAWINGS

FIG. 1A is a view illustrating a general persistent resource allocation method through a DL persistent allocation A-MAP IE;

FIG. 4 is a view illustrating a persistently allocated resource receiving method in accordance with another exemplary embodiment;

MODES FOR CARRYING OUT THE
PREFERRED EMBODIMENTS

Embodiments of the present invention will be described below in detail with reference to the accompanying drawings where those components are rendered the same reference number that are the same or are in correspondence, regardless of the figure number, and redundant explanations are omitted. In describing the present invention, if a detailed explanation for a related known function or construction is considered to unnecessarily divert the gist of the present invention, such explanation has been omitted but would be understood by those skilled in the art. The accompanying drawings are used to help easily understood the technical idea of the present invention and it should be understood that the idea of the present invention is not limited by the accompanying drawings. The idea of the present invention should be construed to extend to any alterations, equivalents and substitutes besides the accompanying drawings.

The term 'terminal' used herein may be replaced with other terms, such as Subscriber Station (SS), User Equipment (UE), Mobile Equipment (ME), Mobile Station (MS) and the like.

Also, the terminal may be a type of portable device having a communication function such as a cellular phone, Personal Digital Assistant (PDA), a smart phone, a notebook and the like, or a non-portable device such as Personal Computer (PC), vehicle-mounted device and the like.

Figure 1B:
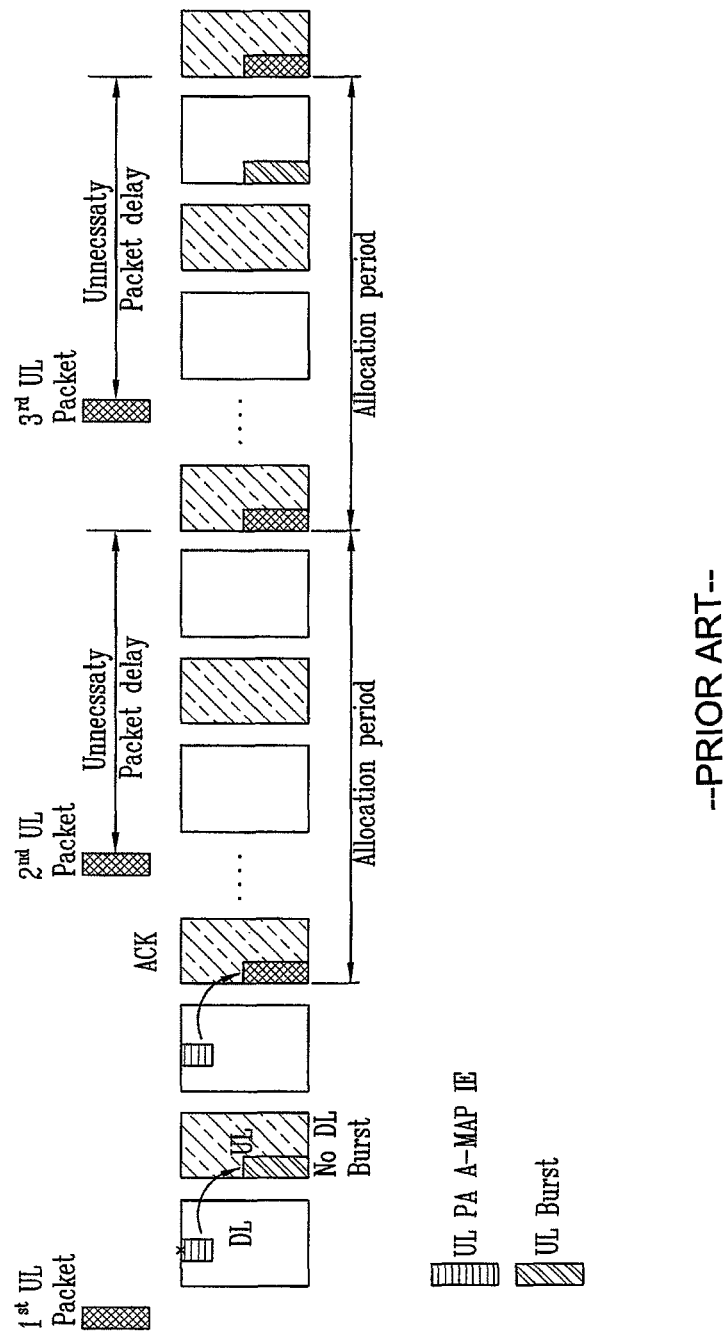
FIG. 1B is a view illustrating a general persistent resource allocation method through an UL persistent allocation A-MAP IE.
Figure 2A:
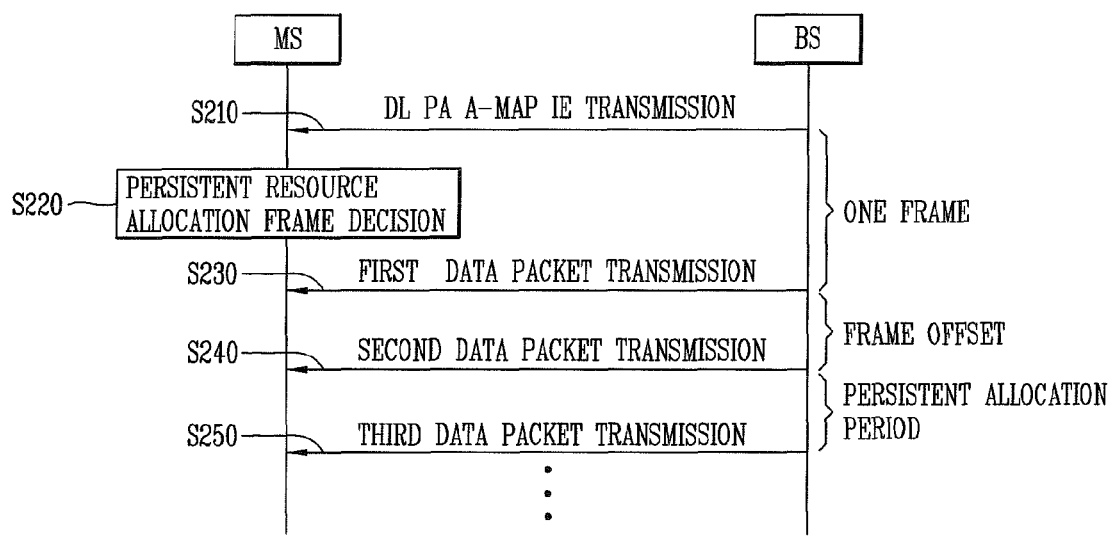
FIG. 2A is a flowchart illustrating a persistently allocated resource receiving method in accordance with one exemplary embodiment.
Figure 2B:
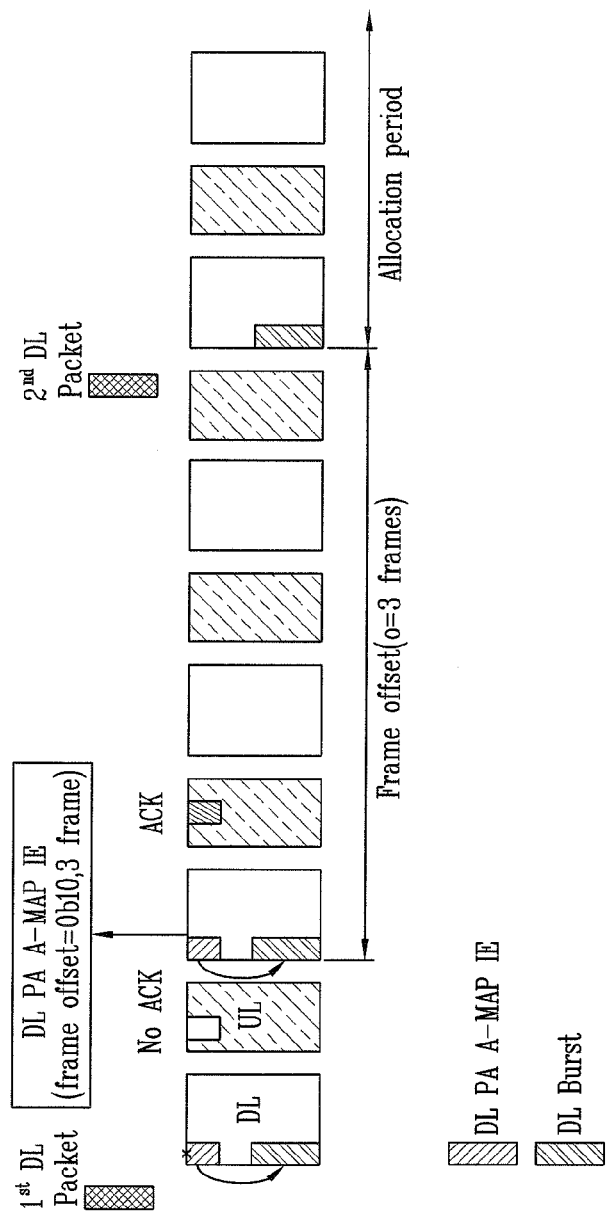
FIG. 2B is a view illustrating a DL persistently allocated resource receiving method according to FIG. 2A.
Figure 2C:
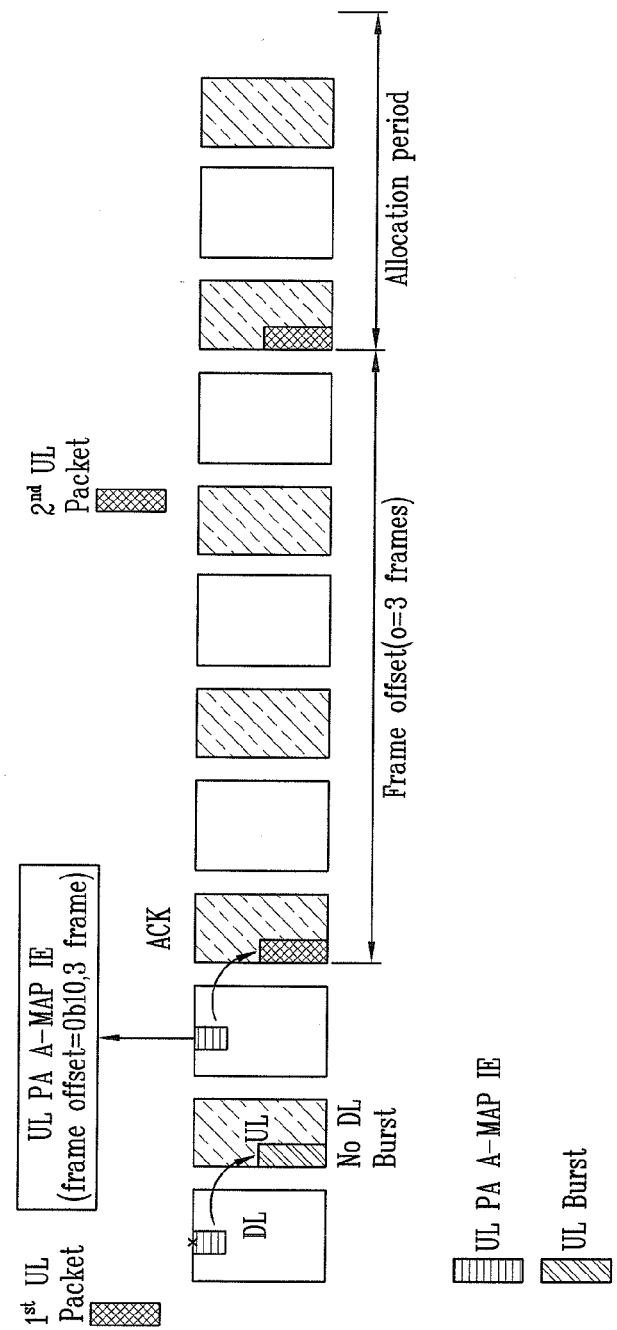
FIG. 2C is a view illustrating an UL persistently allocated resource receiving method according to FIG. 2B.

FIG. 2A is a flowchart illustrating a persistently allocated resource receiving method in accordance with one exemplary embodiment, FIG. 2B is a view illustrating a DL persistently allocated resource receiving method according to FIG. 2A, and FIG. 2C is a view illustrating an UL persistently allocated resource receiving method according to FIG. 2B.

Hereinafter, a DL persistent resource allocation will be exemplarily described.

First, a terminal may receive a persistent resource allocation message (for example, DL Persistent Allocation A-MAP IE) from a base station (S210). The persistent resource allocation message may include information required to persistently allocate resources to the terminal.

The terminal may then determine whether the received persistent resource allocation message includes frame position information related to a second persistent resource allocation.

Here, the frame position information may be frame offset information, which indicates that a frame for allocating a second persistent resource is located after preset frames from a frame to which a first persistent resource is allocated.

That is, the frame position information indicates a frame number, which indicates after how many frames, from the frame where the persistent resource allocation message has been received, the frame for allocating the second persistent resource is located.

For example, if it is assumed that a frame number where an initial persistent resource allocation is performed is N and the frame position information is 3, a frame number where a second persistent resource allocation is performed is N+3.

Also, a size of the frame position information and a frame number interval may be set to various values. For example, the size of the frame offset information may be set to a 4-bit, 3-bit, 2-bit or 1-bit length, and the frame number may be set to a value of a 1-frame interval, 2-frame interval, 4-frame interval or 2-multiple interval.

If the frame position information is not included, the terminal may receive a data packet using the persistent resource allocated through the DL persistent allocation A-MAP IE at each predetermined frame according to a persistent allocation period included in the persistent resource allocation message.

If it is determined that the frame position information related to the second persistent resource allocation is included, the terminal decides a frame position for allocating the persistent resource based on the persistent allocation period and the frame position information included in the persistent resource allocation message (S220). Here, the process of deciding the frame position for allocating the persistent resource may include deciding a frame position to which a second persistent resource is allocated based on the frame position information. Frame positions for allocating persistent resources after the second persistent resource may be decided according to the persistent allocation period information. Here, positions to which the persistent resources are allocated at the corresponding frames are the same. That is, when the first resource is allocated to a second sub frame, a frame position for allocating a resource for the next packet may be indicated by the DL persistent allocation A-MAP IE, and the resource for the next packet may be allocated to a second sub frame of the corresponding frame as done in the first resource allocation.

Next, the terminal may receive a data packet at the decided frame position using the allocated persistent resource.

The following Table 1 shows an example of frame offset information transmitted through DL/UL persistent allocation A-MAP IE.

That is, when the persistent allocation period included in the persistent resource allocation message is '4 frames', third and further data packets are received at frames N+7, N+11, . . . (S250).

In Table 1, the size of the frame offset information is set to 2 bits and the frame number is set to a 1-frame interval. Alternatively, the size of the frame offset information may be set to various bit lengths, such as a 4-bit, 3-bit, 2-bit or 1-bit length, and the frame number may be set to various frame intervals, such as a 1-frame interval, 2-frame interval, 4-frame interval or 2-multiple interval.

As another embodiment, a last or initial value of the frame offset information may be set as a persistent allocation period value. Here, when the terminal has received the DL persistent allocation A-MAP IE without retransmission, the second resource allocation can be performed according to the persistent allocation period.

For example, in case where the last value of the frame offset information is set to the persistent allocation period value, a persistent allocation period value is indicated when the last value is set to '0b1' upon the frame offset information having 1-bit length, '0b11' upon the frame offset information having 2-bit length, or '0b111' upon the frame offset information having 3-bit length. Also, in case where the initial value of the frame offset information is set to the persistent allocation period value, the persistent allocation period value is indicated when the initial value is set to '0b0' upon the frame offset information having 1-bit length, '0b00' upon the frame offset information having 2-bit length, or '0b000' upon the frame offset information having 3-bit length.

The following Table 2 shows one exemplary embodiment that a last value of frame offset information transmitted via a DL/UL persistent allocation A-MAP IE is set to a persistent allocation period value.

TABLE 1

| Syntax | Size in bits | Description/Notes |
| --- | --- | --- |
| DL Persistent Allocation A-MAP_IE or UL Persistent Allocation A-MAP_IE( ) { | — | — |
| ...... | ...... | ...... |
| Frame offset of Second allocation (o) | 2 | Frame number indicating after how many frames, from a frame for allocating a first resource, a frame for allocating a resource for a second packet is located<br>0b00: 1 frame<br>0b01: 2 frames<br>0b10: 3 frames<br>0b11: 4 frames |
| ...... | ...... | ...... |
| } | | |

TABLE 2

| Syntax | Size in bits | Description/Notes |
| --- | --- | --- |
| DL Persistent Allocation A-MAP_IE or UL Persistent Allocation A-MAP_IE( ) { | — | — |
| ...... | ...... | ...... |
| Frame offset of Second allocation (o) | 2 | Frame number indicating after how many frames, from a frame for allocating a first resource, a frame for allocating a resource for a second packet is located<br>0b00: 1 frame<br>0b01: 2 frames<br>0b10: 3 frames<br>0b11: After allocation period (p) |
| ...... | ...... | ...... |
| } | | |

As shown in Table 1, when a base station has set a value of frame offset information to '0b10', a frame position for a second persistent resource allocation is located apart by three frames (i.e., N+3) from a frame position (N frame) for allocating the first persistent resource (S230), and a resource is allocated to the corresponding frame position (N+3) from the same resource index of the same sub frame as the first resource allocation (S240). Also, frame positions for allocating resources for third and further data packets may be decided by a persistent allocation period value included in the DL persistent allocation A-MAP IE from the second resource allocation.

As shown in Table 2, when the size of the frame offset information is set to 2-bit and the last value is set to '0b11', a persistent resource for a second data packet is allocated to a frame located after a persistent allocation period from a frame for allocating a persistent resource for a first data packet.

Figure 3A:
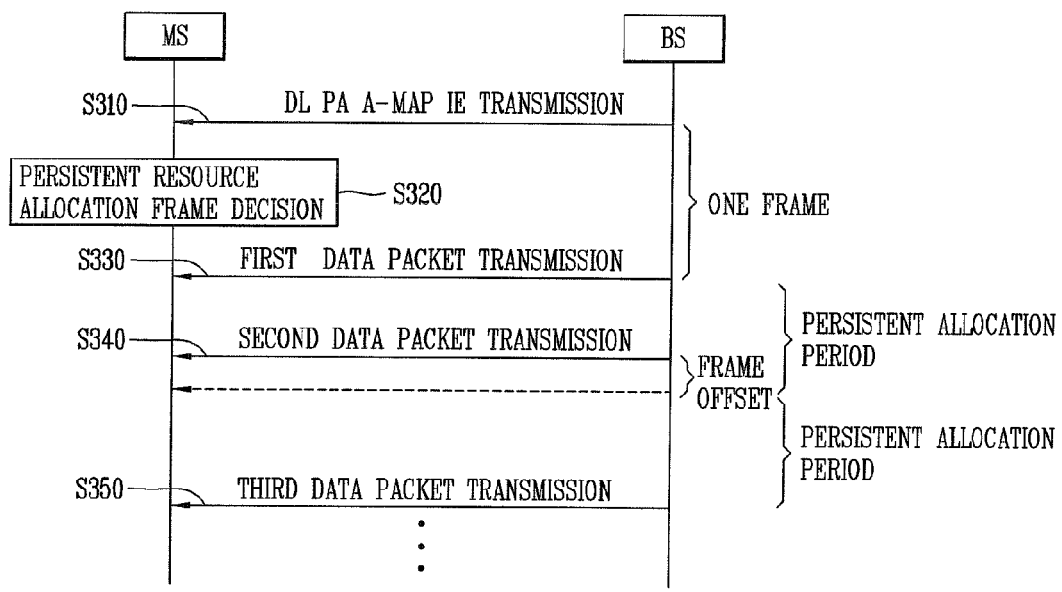
FIG. 3A is a flowchart illustrating a persistently allocated resource receiving method in accordance with another exemplary embodiment.
Figure 3B:
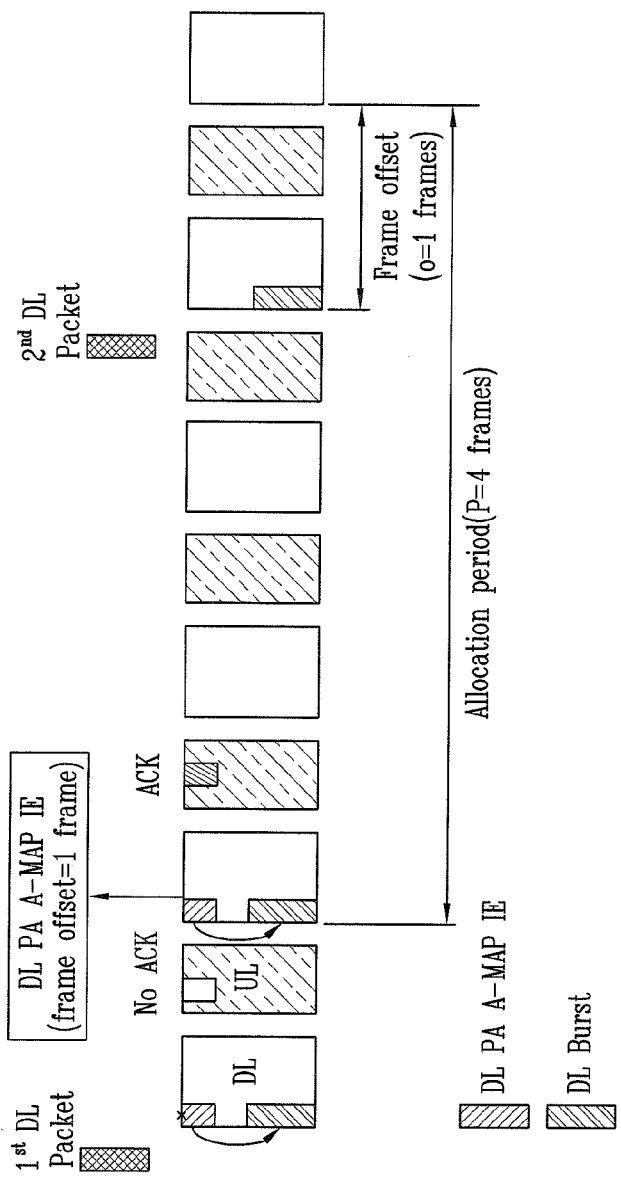
FIG. 3B is a view illustrating a DL persistently allocated resource receiving method according to FIG. 3A.
Figure 3C:
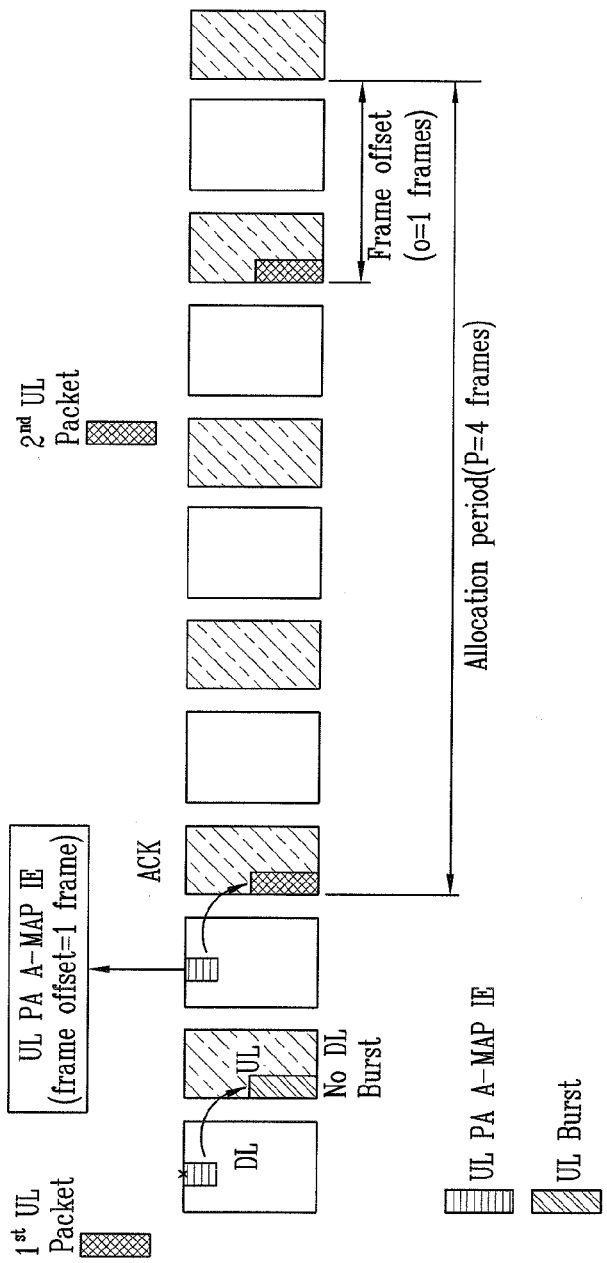
FIG. 3C is a view illustrating an UL persistently allocated resource receiving method according to FIG. 3A.

FIG. 3A is a flowchart illustrating a persistently allocated resource receiving method in accordance with another exemplary embodiment, FIG. 3B is a view illustrating a DL persistently allocated resource receiving method according to FIG. 3A, and FIG. 3C is a view illustrating an UL persistently allocated resource receiving method corresponding to FIG. 3B.

Hereinafter, a DL persistent resource allocation method will be exemplarily described.

First, a terminal may receive a persistent resource allocation message (for example, DL persistent allocation A-MAP IE) (S310). The persistent resource allocation message may include information required to persistently allocate resources to the terminal.

Next, the terminal may then determine whether the received persistent resource allocation message includes frame position information related to a second persistent resource allocation.

Here, the frame position information may be frame offset information, which indicates that a frame for allocating a second persistent resource is located before predetermined frames after the persistent resource allocation period from a frame for allocating a first persistent resource.

That is, the frame position information may be a frame number, which indicates before how many frames, after a persistent allocation period from the frame where the persistent resource allocation message has been received, the frame for allocating the second persistent resource is located.

The position of the frame for allocating the second persistent resource will be expressed by the following Equation 1.

Frame for allocating second persistent resource=Frame number for allocating first persistent resource+persistent allocation period−frame offset    Equation 1

For example, when a frame number for allocating a first persistent resource is N, a persistent allocation period is 4 and a frame offset information is 1, a frame number for allocating a second persistent resource is N+3(4−1).

Also, the size of the frame offset information may be set to various bit lengths, such as a 4-bit, 3-bit, 2-bit or 1-bit length, and the frame number may be set to various frame intervals, such as a 1-frame interval, 2-frame interval, 4-frame interval or 2-multiple interval.

If the frame position information is not included, the terminal may receive a data packet using a persistent resource allocated through the DL persistent allocation A-MAP IE at each predetermined frame according to the persistent allocation period included in the persistent resource allocation message.

If it is determined that the frame position information related to the second persistent resource is included, a frame position for allocating a persistent resource is decided based on the persistent allocation period and the frame position information included in the persistent resource allocation message (S320). Here, the process of deciding the frame position for allocating the persistent resource may include deciding a frame position for allocating the second persistent resource based on the frame position information. Frame positions for allocating persistent resources after the second persistent resource may be decided according to the persistent allocation period information. Here, positions to which the persistent resources are allocated at the corresponding frames are the same. That is, when the first resource allocation is performed at a second sub frame, a frame position for allocating a resource for the next packet may be indicated by the DL persistent allocation A-MAP IE, and the resource for the next packet may be allocated to a second sub frame of the corresponding frame as done in the first resource allocation.

Next, a data packet may be received using the persistent resource allocated to the decided frame position. That is, the terminal may receive a first data packet using the persistent resource allocated to the frame position where the DL persistent allocation A-MAP IE has been received (S330). Also, a second data packet may be received using a persistent resource allocated to a frame position decided by Equation 1 (S340). A frame to which a resource for a second packet is allocated may be indicated based on (the first allocation frame+the persistent allocation period). That is, it is indicated before how many frames, from the frame corresponding to (the first allocation frame+the persistent allocation period), a frame for allocating a resource is located. For example, when the frame offset information indicates 2-frame, the second resource allocation is performed at a frame corresponding to ((the first allocation frame+the persistent allocation period)−2 frames). Also, packets succeeding the second data packet may be received at corresponding frames according to the persistent allocation period (S350).

The following Table 3 shows one exemplary embodiment of frame offset information transmitted via a DL/UL persistent allocation A-MAP IE, especially, frame offset information according to Equation 1.

TABLE 3

| Syntax | Size in bits | Description/Notes |
| --- | --- | --- |
| DL Persistent Allocation A-MAP_IE or UL Persistent Allocation A-MAP_IE( ) { | — | — |
| ...... | ...... | ...... |
| Frame offset of Second allocation (o) | 2 | Frame number indicating before how many frames, from a frame of (first resource allocation frame + allocation period(p)), a frame(o) for allocating resource for a second packet is located. Example 1) 0b00: 0 frame (allocating after allaction period) 0b01: 1 frame (allocating at a first frame before a frame corersponding to the allocation period. namely, allocating at (current frame + P-1) frame) 0b10: 2 frames (allocating at a second frame before the frame corresponding to the allocation period, namely, allocating at (current frame + P-2) frame) 0b11: 3 frames (allocating at a third frame before a frame corersponding to the allocation period, namely, (current frame + P-3) frame) |
| ...... | ...... ...... | |
| } | | |

Table 3 shows the case that the size of the frame offset information is set to 2-bit, and the frame number is set to a 1-frame interval. As aforementioned, the size of the frame offset information may be set to various bit lengths, such as a 4-bit, 3-bit, 2-bit or 1-bit length, and the frame number of the frame offset information may be set to various frame intervals, such as a 1-frame interval, 2-frame interval, 4-frame interval or 2-multiple interval.

Referring to Table 3, an initial value of the frame offset information related to the second resource allocation is 0 frame. This indicates that the second resource allocation is performed after the persistent allocation period after the first resource allocation.

FIG. 4 is a view illustrating a persistently allocated resource receiving method in accordance with another exemplary embodiment.

Hereinafter, a DL persistent resource allocation method will be exemplarily described.

First, when a terminal has failed to receive a DL persistent allocation A-MAP IE initially transmitted from a base station (S410), the terminal may receive a persistent resource allocation message (for example, DL persistent allocation A-MAP IE), which includes transmission count information, namely, information related to the number of times that the persistent resource allocation message is transmitted, from the base station through a retransmission process (S420). The persistent resource allocation message may include information required to persistently allocate resources.

Next, the terminal may determine whether the received persistent resource allocation message includes frame position information related to second persistent resource allocation. Here, if the frame position information is not included, the terminal may receive a data packet using a persistent resource allocated through the DL persistent allocation A-MAP IE at each predetermined frame according to a persistent allocation period included in the persistent resource allocation message.

If it is determined that the frame position information related to the second persistent resource allocation is included, a frame position for allocating a persistent resource is decided based on the persistent allocation period and the frame position information related to the second persistent resource allocation included in the persistent resource allocation message (S430).

The frame position information related to the second persistent resource allocation corresponds to transmission count information indicating the number of times that the persistent resource allocation message is transmitted. That is, a DL persistent allocation A-MAP IE may be transmitted by including information indicating whether the current transmission of the DL persistent allocation A-MAP IE is a first transmission, a second transmission, . . . , or Nth transmission. For example, when the persistent resource allocation message is received by the terminal after a third transmission through a retransmission process, the frame position information related to the second persistent resource allocation is 2.

The information related to the transmission count information included in the persistent resource allocation message indicates a frame position for the second persistent resource allocation according to the number of times that the DL persistent allocation A-MAP IE is transmitted. Here, the process of deciding the frame position for allocating the persistent resource may be implemented so as to decide a frame position for the second persistent resource allocation using Equation 2, and decide frame positions for allocating persistent resources after the second persistent resource based on the persistent allocation period information.

Frame position for second persistent resource allocation=persistent allocation period−the number of transmission of persistent resource allocation message        Equation 2

Next, the terminal may receive a data packet using the persistent resource allocated to the decided frame (S440~S460).

The following Table 4 shows one exemplary embodiment of transmission count information (Transmission Identifier (TID)) related to a persistent resource allocation message transmitted via a DL/UL persistent allocation A-MAP IE.

As aforementioned, the size of the TID may be set to various bit lengths, such as a 4-bit, 3-bit, 2-bit or 1-bit length, and the frame number of the TID may be set to various frame intervals, such as a 1-frame interval, 2-frame interval, 4-frame interval or 2-multiple interval.

TABLE 4

| Syntax | Size in bits | Description/Notes |
|---|---|---|
| DL Persistent Allocation A-MAP_IE or UL Persistent Allocation A-MAP_IE( ) { | — | — |
| ...... | ...... | ...... |
| TID | 2 | Transmission identifier (TID): indicating how many times the corresponging IE is transmitted. 0b00: indicating a first transmission, and performing a second allocation after an allcation period 0b01: indicating a second transmission, and performing a second resource allocation at (Allocation period-1) frame after a first resource allocation. 0b10: indicating a third transission, and performing a second resource allocation at (Allocation period-2) frame after a first resource allocation. 0b11: indicating a fourth transmission, and performing a second resource allocation at (Allocation period-3) frame after a first resource alocation. |
| ...... | ...... | ...... |
| } | | |

Figure 5:
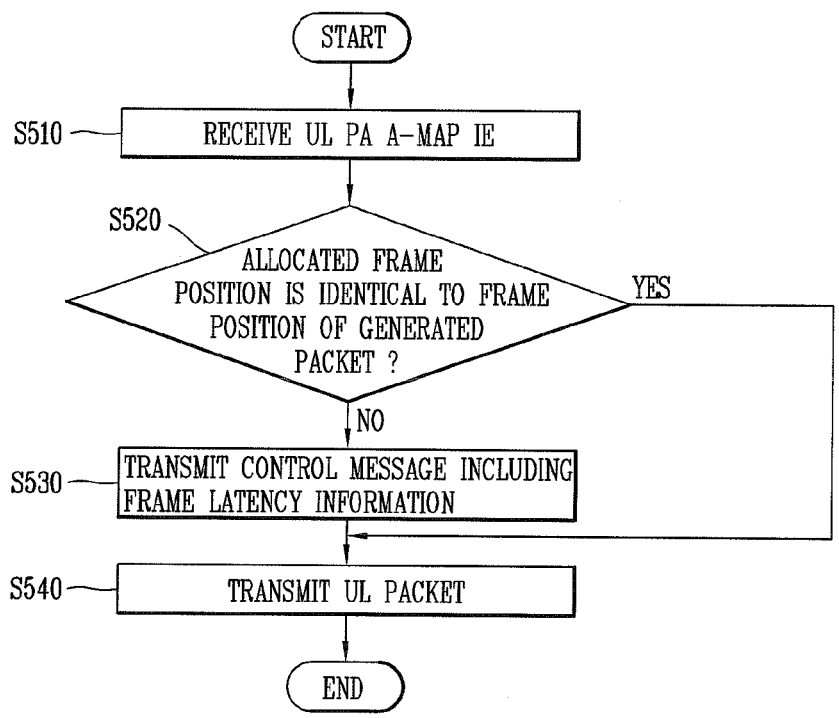
FIG. 5 is a flowchart illustrating a method for adjusting a frame of a persistently allocated resource in a terminal in accordance with one exemplary embodiment.

FIG. 5 is a flowchart illustrating a method for adjusting a frame of a persistently allocated resource in a terminal in accordance with one exemplary embodiment.

First, a terminal may receive an uplink persistent resource allocation message (for example, UL persistent allocation A-MAP IE) from a base station (S510). The persistent resource allocation message may include allocation information required to persistently transmit data to the base station.

The terminal may then determine whether a frame position to which the persistent resource has been allocated using the received persistent resource allocation message is identical to a frame position of a data packet generated in the terminal (S520). Here, the data packet generated in the terminal indicates an uplink data packet to be transmitted to the base station.

If it is determined that the frame position to which the persistent resource has been allocated from the base station is not identical to the frame position of the data packet generated in the terminal, the terminal may transmit a control message for adjusting the frame position, to which the persistent resource has been allocated, to the base station (S530). Here, the control message may be an extended header, and include frame adjustment information for adjusting the persistent resource-allocated frame position.

When the control message is the extended header, the frame position adjustment information may be transmitted via a Frame Latency Adjustment Extended Header (FLAEH) or Piggybacked Bandwidth Request Extended Header (PBREH).

The terminal may transmit the UL data packet using the persistent resource allocated to the frame position adjusted by the base station (S540).

The following Table 5 shows frame latency information transferred via FLAEH in accordance with one exemplary embodiment.

TABLE 5

| Syntax | Size (bits) | Notes |
| --- | --- | --- |
| FLAEH ( ){ | | |
| Type | 4 | Frame latency adjustment Extended header type |
| Frame latency | 4 | Frame latency. The number of frames previous to the current one in which the transmitted data was available. When the latency is greater than 15 then the FL field shall be set to 15. |
| } | | |

As shown in Table 5, when it is determined to adjust a frame latency with respect to a periodic resource allocation, the terminal transmits the FLAEH including the frame latency information to the base station. Upon reception of the FLAEH, the base station adjusts a position of the corresponding resource allocation according to a value set in a frame latency field of the FLAEH.

The following Table 6 shows an exemplary embodiment of transmitting frame latency information through the PBREH.

TABLE 6

| Syntax | Size (bit) | Notes |
| --- | --- | --- |
| PBREH( ) { | | |
| Type | TBD | PBREH type |
| Flow indicator | 1 | 0b0: The same single flow as FID of AGMH |
| If (Flow indicator ==0 ) | | |
| { | | |
| If (scheduling service type == ertPS) { | | |
| FL1 | 1 | |
| FL | 4 | |
| BR size | 11 | |
| } else { | | |
| BR size | 16 | |
| } | | |
| } else { | | |
| ...... | ...... | ...... |

As shown in Table 6, the terminal transmits frame latency information to the base station using a flow indicator. The flow indicator may be set to 0 when information transmitted via the PBREH includes only information related to a flow, such as flow ID of AGMH. That is, when trying to perform piggyback BR for the flow ID of the AGMH, the flow indicator is set to 0. Also, when including information related to a flow different from the flow ID of the AGMH or requesting for a bandwidth for at least one flow, the flow indicator is set to 1.

Figure 6:
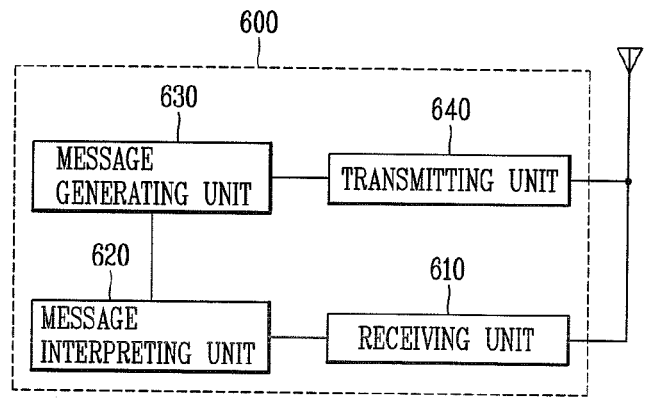
FIG. 6 is an internal block diagram of a terminal in accordance with an exemplary embodiment.

FIG. 6 is an internal block diagram of a terminal 600 in accordance with an exemplary embodiment.

A terminal may include a receiving unit 610, a message interpreting unit 620, a message generating unit 630, and a transmitting unit 640.

First, the receiving unit 610 may receive persistent resource allocation message including persistent resource allocation information from a base station.

The message interpreting unit 620 may check the received persistent resource allocation message to determine whether a frame position to which a persistent resource has been allocated through the persistent resource allocation message is identical to a frame position of an uplink data packet generated in the terminal.

The message generating unit 630 may generate a message including frame latency information when it is determined that the allocated frame position is not identical to the frame position where the data packet has been generated. Here, the generated message may be a Frame Latency Adjustment Extended Header (FLAEH) or Piggybacked Bandwidth Request Extended Header (PBREH). Also, the frame latency information may be information for instructing that a position of the persistent resource-allocated frame shall be adjusted to be preceding to a position of a current frame.

The transmitting unit 640 may transmit the generated message to the base station. Also, the transmitting unit 640 may transmit an uplink data packet through a persistent resource allocated from the base station.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

The invention claimed is:

1. A method for receiving, by a terminal, a data packet via a persistently allocated resource, the method comprising:
   receiving a persistent resource allocation message having a persistent allocation period and frame offset information from a base station; and
   receiving a frame having a data packet on the persistently allocated resource, non-periodically with respect to the persistent allocation period,
   wherein a non-periodical reception timing of the frame is computed based on the frame offset information which indicates a number of frames between the frame and a predetermined frame position.

2. The method of claim 1, wherein the predetermined frame position is a position of an initial frame for a persistent resource allocation.

3. The method of claim 1, wherein the predetermined frame position is located after the persistent allocation period from an initial frame for a persistent resource allocation.

4. The method of claim 1, wherein the frame offset varies according to a number of retransmissions of the persistent resource allocation message from the base station.

5. The method of claim 4, further comprising:
   computing the non-periodical reception timing of the frame using the frame offset information.

6. The method of claim 1, wherein the non-periodical reception timing of the frame is earlier than a timing according to the persistent allocation period.

7. The method of claim 1, wherein the persistent resource allocation message is received via an initial frame for a persistent resource allocation and the received frame is a second frame for the persistent resource allocation.

8. The method of claim 1, further comprising:
   receiving a third frame for a persistent resource allocation periodically according to the persistent allocation period.

9. The method of claim 8, wherein the third frame is received without frame latency, regardless of whether the persistent resource allocation message has been received by a retransmission process.

10. A device in a terminal in a broadband wireless communication system in which a persistent allocation technique is employed, the device comprising:

a receiving unit configured to receive a persistent resource allocation message having a persistent allocation period and frame offset information from a base station; and a processor configured to control the receiving unit to receive a frame non-periodically with respect to the persistent allocation period, wherein a non-periodical reception timing of the frame is computed based on the frame offset information which indicates a number of frames between the frame and a predetermined frame position.

11. The device of claim 10, wherein the predetermined frame position is a position of an initial frame for a persistent resource allocation.

12. The method of claim 10, wherein the predetermined frame position is located after the persistent allocation period from an initial frame for a persistent resource allocation.

* * * * *